United States Patent [19]

Kaneko et al.

[11] Patent Number: 5,103,332
[45] Date of Patent: Apr. 7, 1992

[54] COLOR IMAGE FORMING METHOD PROVIDING BALANCED COLOR TONE

[75] Inventors: Shuzo Kaneko, Kanagawa; Toshikazu Ohnishi, Tokyo; Takashi Kai, Kanagawa, all of Japan

[73] Assignee: Canon Kabushiki Kaisha, Tokyo, Japan

[21] Appl. No.: 550,437

[22] Filed: Jul. 10, 1990

[30] Foreign Application Priority Data

Jul. 10, 1989 [JP] Japan .................. 1-175620

[51] Int. Cl.$^5$ .............................. G02F 1/13
[52] U.S. Cl. .......................... 359/98; 346/76 PH; 359/43; 359/45; 359/68; 359/96; 430/20
[58] Field of Search ............ 350/330, 339 F, 351, 350/331 T, 349, 350 R; 346/108, 135.1, 76 PH; 430/20, 286, 945

[56] References Cited

U.S. PATENT DOCUMENTS

| | | | |
|---|---|---|---|
| 4,293,435 | 10/1981 | Portugall et al. | 350/330 |
| 4,378,302 | 3/1983 | Aftergut et al. | 350/349 |
| 4,396,251 | 8/1983 | Mukoh et al. | 350/349 |
| 4,702,558 | 10/1987 | Coles et al. | 350/351 |
| 4,734,359 | 3/1988 | Oguchi et al. | 430/945 |
| 4,777,492 | 10/1988 | Ohnishi et al. | 346/1.1 |
| 4,965,591 | 10/1990 | Kurabayashi et al. | 346/108 |
| 5,059,000 | 10/1991 | Kaneko et al. | 359/43 |

FOREIGN PATENT DOCUMENTS

| | | |
|---|---|---|
| 10930 | 1/1984 | Japan . |
| 154120 | 6/1989 | Japan . |
| 00576 | 1/1990 | Japan . |

*Primary Examiner*—Rolf Hille
*Assistant Examiner*—Tan Ho
*Attorney, Agent, or Firm*—Fitzpatrick, Cella, Harper & Scinto

[57] ABSTRACT

A color image forming method provides clear color images with good color balance by thermally controlling a thermosensitive medium, such as polymer liquid crystal. The medium is capable of reversibly assuming optical states of being transparent and of scattering light, and allows picture-element display areas in at least two colors to be composed on a surface thereof. Picture elements within color areas are selected if they correspond to the color whose spectral transmission center is, among those of the colors to be displayed, closest to the longest wavelength involved. Heat is applied such that the maximum haze degree of the selected picture elements is greater than that of picture elements corresponding to any of the other colors.

28 Claims, 6 Drawing Sheets

COLOR IMAGE FORMING METHOD PROVIDING BALANCED COLOR TONE

BACKGROUND OF THE INVENTION

1. Field of the Invention

The present invention relates to a method of forming color images and, more particularly, to a method of forming color images by causing differences in light-scattering and transparent optical states.

2. Description of the Related Art

Images have previously been displayed in various forms such as, for instance, outputs displayed on a cathode ray tube (CRT) or a display monitor using a twisted nematic (TN) liquid crystal from a television or video tape recorder, or from a computer performing a dialogue operation. Generally, however, high-resolution images such as documents or figures produced by a word processor (WP) or facsimile equipment are displayed on paper as printed hard copies.

Recently, polymer liquid crystal displays for outputting still images have been proposed in, e.g., Japanese Patent Laid-Open No. 10930/1984. The use of polymer liquid crystals has the following advantages: it is possible to form a thin film, and obtain a large display area; it is easy to compose elements of a flat display with a polymer liquid crystal; and it is possible to obtain memory images which are as clear and stable as paper outputs. Another advantage is that the optical characteristics of a polymer liquid crystal can be reversibly changed and varied by the application of heat or an electric field so an image can be repeatedly displayed and erased. It is, of course, particularly advantageous to use the polymer liquid crystal in a poly-domain state in order to obtain a display image which is only minimally dependent on the visual field angle.

Various proposals have been made concerning the formation of color images using an image forming medium having one or more polymer liquid crystals. For instance, the present applicant has previously proposed combining a polymer liquid crystal image forming medium with a color filter (Japanese Patent Laid-Open No. 154120/1989); and adding colored materials to the polymer liquid crystal(s), arranging portions of the colored liquid crystal(s) as picture elements on a surface of the medium, and selecting colors for display (Japanese Patent Laid-Open No. 576/1990).

However, when color images are displayed with the above-described media utilizing the light scattering of the polymer liquid crystals, the scattering angle and the scattering efficiency both vary depending on the wavelength of the scattered light. Thus, although displays exhibit excellent image resolution, their tone is unacceptable.

For this reason, there is demand for a method capable of easily correcting the color balance of a display image which is applicable to an image forming medium employing polymer liquid crystal(s).

SUMMARY OF THE INVENTION

The present invention has been accomplished in order to overcome the defects of the prior art. That is, an object of the present invention is to provide a color image forming method capable of achieving good color balance. Thus, the color image forming method is capable of achieving clear color displays using thermosensitive media such as polymer liquid crystals.

According to the present invention, there is provided a color image forming method using a thermosensitive medium capable of reversibly assuming optical states of being transparent and of scattering light to compose, on a surface thereof, picture-element display areas in at least two colors, wherein thermal control is effected to form a color image. The method comprises the steps of: selecting those picture elements which are within the color areas constituting the picture-element display areas which correspond to the color whose spectral transmission center is, among those of the colors to be displayed, closest to the longest wavelength involved; and effecting heat application such that the maximum haze degree of the selected picture elements is greater than the maximum haze degree of those picture elements corresponding to any of the other colors to be displayed.

In one embodiment of the present invention, there is provided a color image forming method in which thermal control is used on a thermosensitive medium capable of reversibly assuming optical states of being transparent and of scattering light to compose, on a surface thereof, picture-element display areas in three colors of green, blue and red, and form a color image thereby. In the method, heat application is effected such that a scattering state of the thermosensitive medium in areas of the color red has a higher scattering degree than that of the thermosensitive medium in areas of any of the other colors.

DETAILED DESCRIPTION OF THE PREFERRED EMBODIMENTS

The optimum type of material which is used to form the thermosensitive medium used in the present invention is a polymer thermotropic liquid crystal because it is capable of forming a thin film. Additionally, a recorded state can be maintained more easily in a polymer liquid crystal than in a low-molecular-weight liquid crystal. Usable polymer thermotropic liquid crystals (hereinafter referred to as "polymer liquid crystals") fall into the following two types:

(1) polymer liquid crystals in which mesogens, or relatively long, rigid and straight groups, are interconnected by bendable chains; and

(2) polymer liquid crystals in which side chains have mesogens, or relatively long, rigid and straight groups.

Such polymer liquid crystals are either used alone or in the form of a mixture of different types of polymer liquid crystals. It is also possible to use (i) a mixture of at least one polymer liquid crystal and at least one low-molecular-weight liquid crystal or (ii) a mixture of at least one polymer liquid crystal and at least one polymer.

Suitable polymer liquid crystals may be in smetic, nematic, cholesteric, or other phases. Discotic polymer liquid crystals may also be used, as well as certain polymer liquid crystals may be advantageously used, in which asymmetric carbon atoms are introduced and which are in a SmC* phase and are ferroelectric. Following are specific embodiments of polymer liquid crystals which may be used to form the image forming medium of the present invention. However, the following are only intended as examples, and the present invention is not intended to be limited thereto.

The examples are described as chemical formulae (I) to (X), and are accompanied by certain transition temperatures. The transition temperature $T_g$ indicates the inflection point from a glass phase to a liquid crystal phase and is commonly expressed as a value measured by differential scanning calorimetry (DSC). The transition temperature $T_{iso}$ from a liquid crystal phase to an isotropic (Iso) phase indicates the peak value obtained by DSC.

Formulae (I) to (VI) represent polymer liquid crystals, Formula (VII) represents a polymer liquid crystal obtained by copolymerizing two types of polymer liquid crystals, and Formulae (VIII) to (X) represent polymer liquid crystals each obtained by copolymerizing three types of polymer liquid crystals. Suitable polymer liquid crystals may be obtained by copolymerizing either the side or main chains of two or more types of polymer liquid crystals.

(I)

(II)

(III)

(IV)

$$\left[ \overset{\displaystyle Br}{ -C(=O)-\text{Ph}-O-C(=O)-\text{Ph}-C(=O)-O-\text{Ph}-C(=O)-O-(CH_2)_{10}-O- } \right]_n \quad (V)$$

Glass $\xrightarrow{140°\text{C.}}$ Liquid Crystal (Sm) Phase $\xrightarrow{196°\text{C.}}$ Iso.

$$\text{-(CH}_2\text{-CH)}_n\text{-}\\ \quad | \\ \quad C=O \\ \quad | \\ \quad O-(CH_2)_5-O-\text{Ph}-\text{Ph}-CN \quad (VI)$$

Glass $\xrightarrow{41°\text{C.}}$ Liquid Crystal (N) Phase $\xrightarrow{114°\text{C.}}$ Iso.

$$\text{-(CH-CH}_2\text{)}_{0.8}\text{-}\\ \quad | \\ \quad C=O \\ \quad | \\ \quad O-(CH_2)_2-O-\text{Ph}-COO-\text{Ph}-CN$$

$$\text{-(CH-CH}_2\text{)}_{0.2}\text{-}\\ \quad | \\ \quad C=O \\ \quad | \\ \quad O-(CH_2)_6-O-\text{Ph}-COO-\text{Ph}-COOCH_2\overset{CH_3}{\underset{}{C}}HOC_3H_7 \quad (VII)$$

Glass $\xrightarrow{55°\text{C.}}$ Liquid Crystal Phase $\xrightarrow{88°\text{C.}}$ Iso.

(VIII)

Copolymer with three units:

Unit x: $-(\text{C}(CH_3)-CH_2)_x-$, C=O, O-CH$_2$, (—)$_2$, O—Ph—C(=O)—O—Ph—OCH$_3$ Unit y: $-(\text{CH}-CH_2)_y-$, C=O, O-CH$_2$, (—)$_6$, O—Ph—C(=O)—O—Ph—C(=O)—O—CH$_2$—C*H(CH$_3$)—O—C$_3$H$_7$ Unit z: $-(\text{CH}-CH_2)_z-$, C=O, O-CH$_2$, (—)$_2$, O—Ph—C(=O)—O—Ph—Ph—CN x/y/z = 3/6/1 x/y/z = 4/4/2  (IX)
x/y/z = 3.5/3.5/3  (X)

Transition Temperatures

|⎯⎯⎯⎯⎯⎯⎯⎯⎯⎯|
$T_g = 26°$ C.   $T_{iso} = 81°$ C.

|⎯⎯⎯⎯⎯⎯⎯⎯⎯⎯|
$T_g = 38°$ C.   $T_{iso} = 98°$ C.

|⎯⎯⎯⎯⎯⎯⎯⎯⎯⎯|
$T_g = 35°$ C.   $T_{iso} = 108°$ C.

(VIII)

(IX)

(X)

In order to form a film of the selected polymer liquid crystal material, polar or non-polar solvents such as dichloroethane, dimethylformamide (DMF), cyclohexane, tetrahydrofuran (THF), acetone, ethanol, or a mixture of any of these may be used. The particular solvent is selected in accordance with factors such as solubility for the polymer liquid crystal used, the properties of the substrate to be coated, the wettability of the surface layer of the substrate, and film-forming ability.

The polymer liquid crystal selected in accordance with the present invention is capable of maintaining its structure at temperatures below the glass transition temperature in order to enable, for instance, the following recording mode, in which:

liquid crystal phase:
poly-domain state  ⟵⟶  isotropic state
(light-scattering)           (between non-light-scattering
                              & transparent)

In this recording mode, the polymer liquid crystal is at first kept in a poly-domain state, i.e., where the medium phase has a multiplicity of domains. The polymer liquid crystal is then heated to a temperature above the temperature at which the liquid crystal enters the isotropic phase. Thereafter, the temperature is rapidly lowered to maintain the polymer liquid crystal in a isotropic phase state, whereupon recording is effected if such is desired. However, when the temperature of the recording areas is gradually dropped after it has been maintained at a temperature in the vicinity of the isotropic temperature region, the areas revert to their initial poly-domain state. Conversely, recording may also, of course, take place in the opposite relationship, i.e., during the light-scattering state. The above-described process, which is either a recording process, or a scattering-state reversion (i.e., erasing) process will be described in detail, with reference to FIG. 3.

Figure 3:
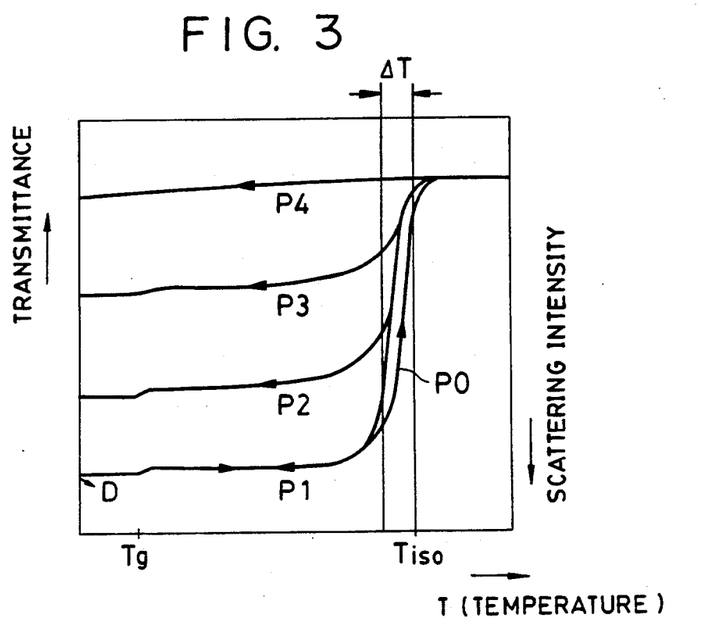
FIG. 3 is a graph showing scattering intensity changes of the liquid crystal phase caused by changes in temperature for either recording or erasing.

In FIG. 3, the symbol D designates a light-scattering state. If the temperature is increased by a heating means, such as by a thermal head, or a laser, to a temperature above $T_{iso}$, as indicated by curve P0 (P representing processing temperatures), and thereafter lowered rapidly, a light-transmitting state which is substantially the same as the isotropic state is maintained, as indicated by a curve P4. On the other hand, if the temperature is increased to a temperature above $T_{iso}$, as again indicated by P0, and thereafter dropped gradually such that the temperature is kept within the range between $T_g$ and $T_{iso}$, and particular, within the relatively high temperature sub-region indicated by $\Delta T$ for a relatively long period (e.g., one to several seconds), the temperature drops as indicated by P1 to correspond to the initial light-scattering state D. At temperatures below $T_g$, the state D is stably maintained. Further, if the temperature is gradually dropped in such a manner that it is kept within the sub-region $\Delta T$ for a relatively short period (e.g., 10 to several hundred milliseconds) as indicated by the curves P2 and P3, it is possible, depending on the rate at which the temperature is gradually dropped, to achieve intermediate transmitting or scattering states. Such control enables gradation.

Figure 4:
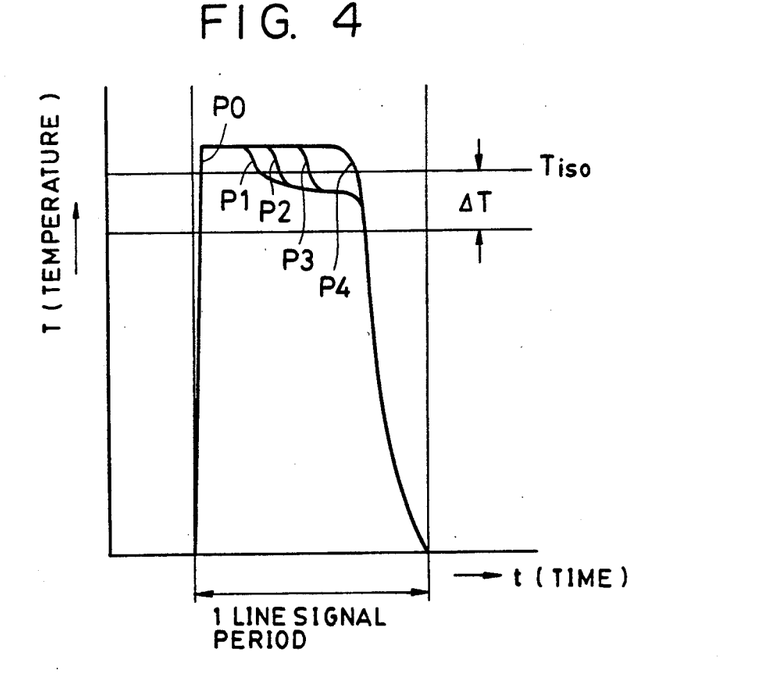
FIG. 4 is a graph showing temperature curves used during the processing of one line to achieve the transmittance levels shown in FIG. 3.

FIG. 4 shows temperature curves used to obtain the transmittance levels shown in FIG. 3. In FIG. 4, the symbols $T_{iso}$, $\Delta T$, and P0 to P4 respectively designate the temperature, the temperature sub-region, and the processing temperatures of FIG. 3. Processing temperatures P1 to P4 each maintain the medium phase in the temperature sub-region $\Delta T$ for a controlled period of time. Processing temperatures such as those indicated by the curves again make it possible to effect recording images with gradation.

According to the present invention, color displays may be attained using the above-described polymer liquid crystal in either of the following two ways. The first manner, as shown in FIG. 8, utilizes the medium with color filter means in which filter portions of three colors (e.g., red (R), green (G) and blue (B)) are arranged in stripes, or in a mosaic, whereby color display is effected in accordance with the differences in the scattering and transparent states of the polymer liquid crystal. The second manner, shown in FIG. 7, utilizes polymer liquid crystal portions of various colors, to which, e.g., dyes corresponding to the colors R, G and B are already added, are regularly or randomly arranged on a surface.

Figure 2:
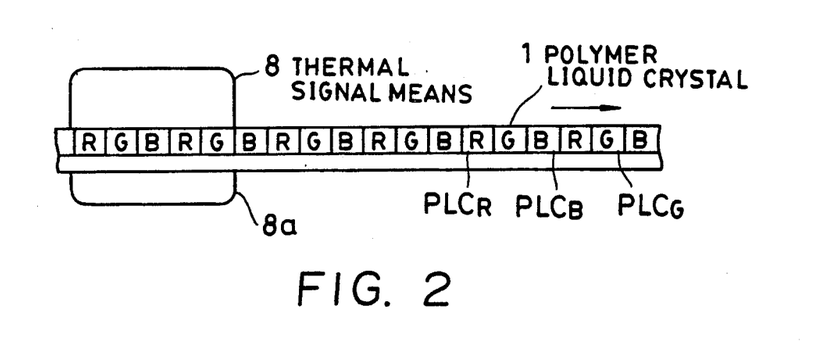
FIG. 2 illustrates a method of thermally recording an image on a polymer liquid crystal film.

Recording is then effected by producing differences in the transparent and light-scattering states of the medium as shown in FIG. 2. In FIG. 2, a sheet having a polymer liquid crystal film 1 moves relative to a thermal signal means 8, 8a, and is heated and scanned by the means.

Figure 7:
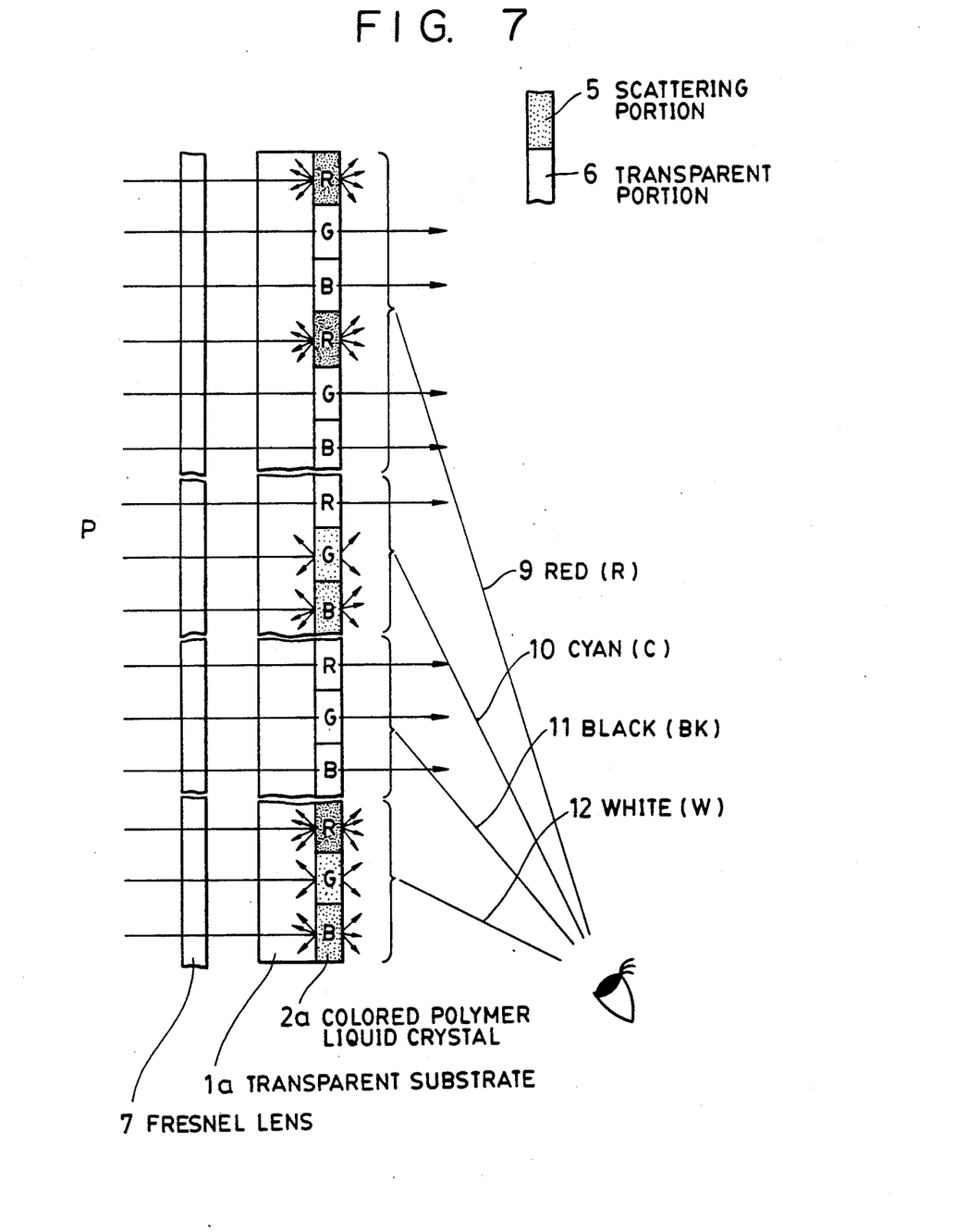
FIG. 7 schematically illustrates the operating principle of one embodiment of the present invention.
Figure 8A:
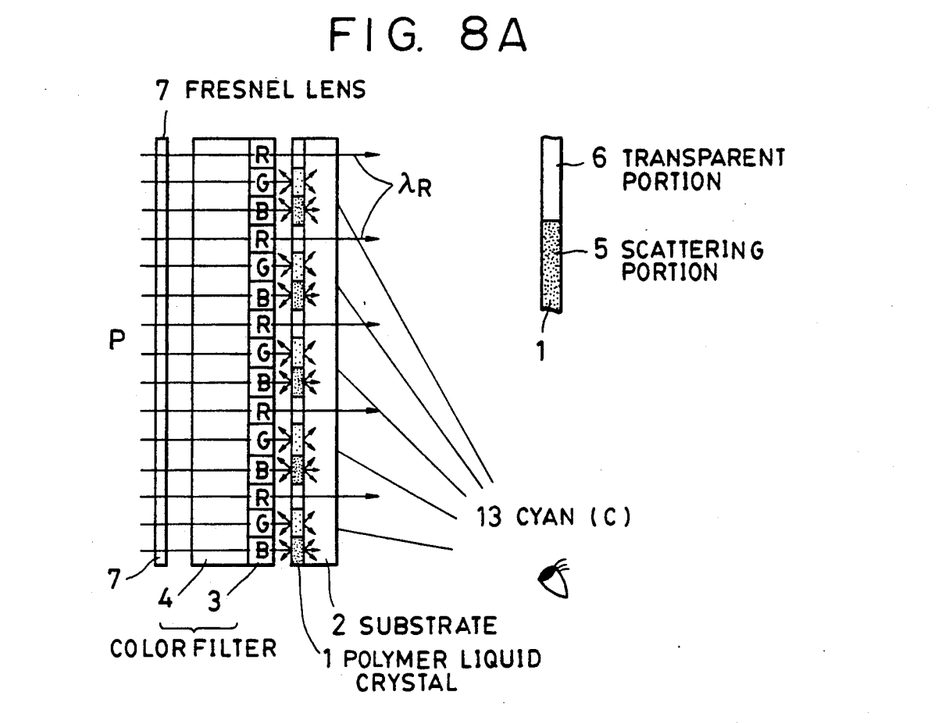
FIGS. 8(a) to 8(c) schematically illustrate the operating principle of another embodiment of the present invention.
Figure 8B:
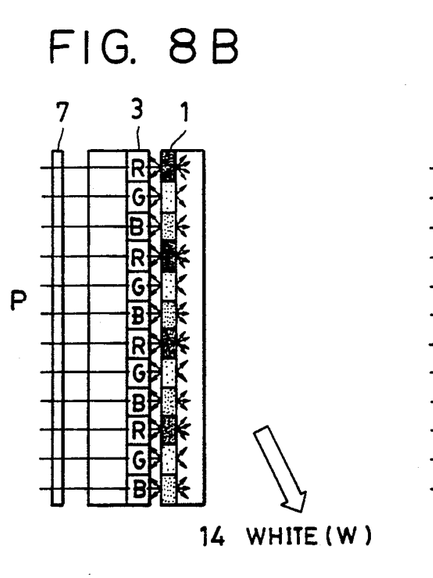
Figure 8C:
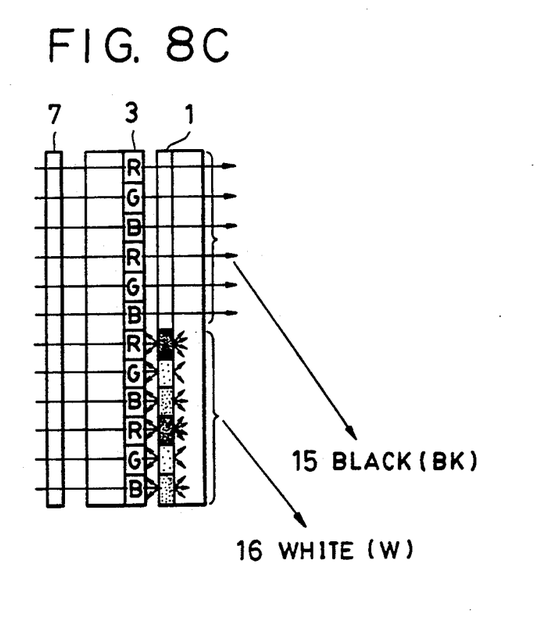

In FIG. 7, a colored polymer liquid crystal medium 2a is coated on a transparent substrate 1a. The medium 2a has light-scattering portions 5 and transparent portions 6. A Fresnel lens 7 is disposed behind the substrate 1a. Reference numerals 9, 10, 11, and 12 respectively denote red (R), cyan (C), black (BK), and white (W) colors. The thickness of the polymer liquid crystal coating is at least 0.5 $\mu$m, and preferably between 1 to 15 $\mu$m.

In FIG. 8, a color filter means having a color filter 3 and a filter substrate 4 is disposed between a Fresnel lens 7 and a substrate 2 coated with a polymer liquid crystal film 1 having light-scattering portions 5 and transparent portions 6. Denoted by reference numerals 13 to 16 are various colors: respectively, cyan 13, white 14 and 16, and black 15.

If it is desired that the polymer liquid crystal film should be colored in at least two different colors so that picture-element areas of different colors will be composed on one surface of the film, dyes or pigments are added to the polymer liquid crystal in the following manner. The dyes or pigments are desirably added in a total amount equal to 0.01 to 30 wt. %, preferably 0.1 to 10 wt. %, more preferably 0.1 to 5 wt. %, relative to the polymer liquid crystal.

The amount of the dyes or pigments added may greatly influence the phase transition temperatures or liquid crystallinity of the polymer liquid crystal in a deleterious manner. In order to avoid these effects, it is preferable that the individual amounts of the dyes or pigments added are substantially equal when broken down by the colors of the medium. Specifically, the dye or pigment amounts (broken down by the colors of the medium), when present in the above discussed total amounts and individually converted into the same volume units, will preferably yield a difference between the amounts of any two colors substantially within the range of $\pm 5\%$.

One of the most important features of the present invention is that, in order to achieve the display of images with good tone, the scattering (haze) degree of certain thermosensitive areas of the medium is increased if such areas correspond to the color(s) whose transmission wavelength(s) is longer than the other displayed wavelengths. This corrects the problems that the intensity with, and the angle at which light is scattered, becomes smaller in proportion to the wavelength which is scattered.

Preferably, the visual sensitivity of each color is also corrected. To this end, an arrangement is provided wherein: the maximum haze degree of areas corresponding to a color which has the transmission peak within the wavelength range of 550 to 560 nm (e.g., green) is lowered; and the maximum haze degree of areas corresponding to color(s) having a transmission peak above 560 nm is increased proportionally to increases in peak wavelength.

Figure 1:
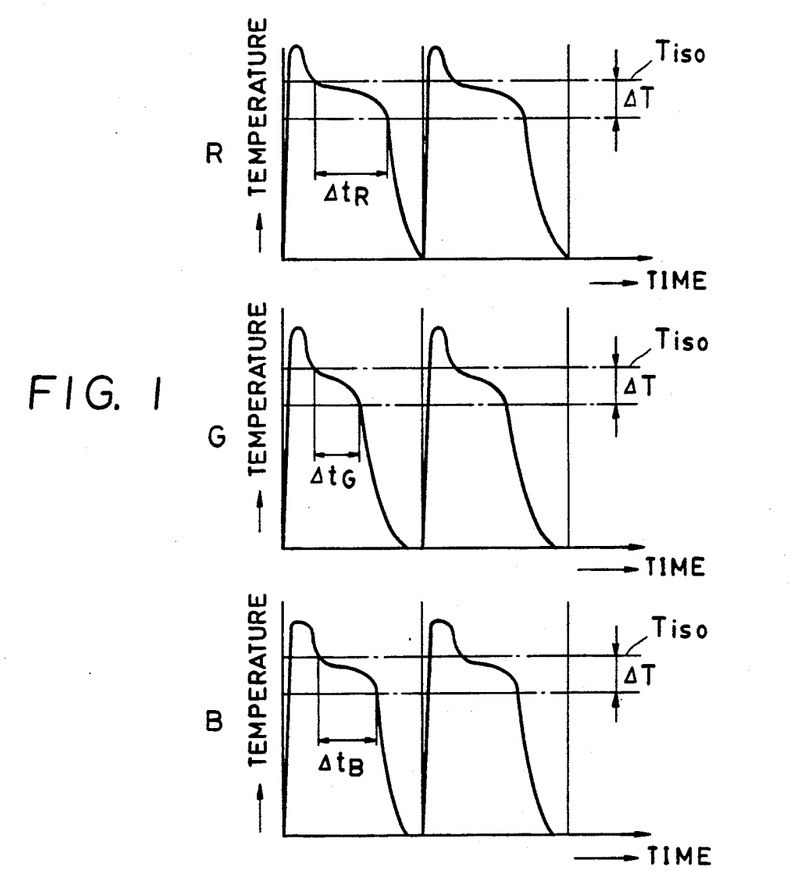
FIG. 1 shows an example of temperature control which is performed to process two lines in order to achieve the maximum degree of scattering for each of the colors R, G and B according to the present invention.

Specifically, various areas of the medium are held within the above-described temperature sub-region $\Delta T$ for periods varying in accordance with the individual colors the areas correspond to. If an area corresponds to a color requiring an increase in the scattering (haze) degree of the medium, the period during which the temperature of the area is maintained within the sub-region $\leftarrow T$ is increased, to thereby increase the scattering intensity in this area. FIG. 1 shows an example of temperature control performed during the processing of two lines which is adapted to achieve the maximum scattering degree for each color. In this example, the arrangement is such that the temperature is kept within the sub-region $\Delta T$ for the longest period ($\Delta t_R$) in the medium areas corresponding to red (R), whereas the temperature is kept within $\Delta T$ for the shortest period ($\Delta t_G$) in the areas corresponding to green (G).

The present invention will now be specifically described by way of examples.

EXAMPLE 1

In this example, display is effected in the manner shown in FIG. 7 as follows.

A polymer liquid crystal material and dyes of dichromatic, anaxial or other suitable type are mixed. The dyes which are selected are capable of optical absorption within at least the visible region, such as blue (B), green (G) and red (R). The admixture is then applied as a coated film on a transparent substrate made of glass, polyester or the like and formed into a color pattern (e.g., a color mosaic or color stripes) using a printing method such as dot printing, or a coating method.

In order to color the polymer liquid crystal in the desired colors, various dyes, such as a red dye (LSR- 405, product of Mitsubishi Kasei Corp., hereinafter "MKC"), a blue dye (LSB-278, product of MKC), and a green dye (a mixture of LSY-116 and LSB-335, both products of MKC), are prepared. Small amounts of the dyes are mixed together and dissolved in a suitable type and amount of solvent. The addition of such dyes to the polymer liquid crystal renders the polymer liquid crystal capable of displaying colors.

An image carrying sheet was then prepared using the polymer liquid crystal of Formula (VI) as the medium with 2 wt. % of each of the above-mentioned dyes in admixture. The mixture was applied to the surface of a substrate of polyethylene terephthalate and formed as a color-striped coating of 10 μm thickness. Since a thermal head having 12 heating elements per 1 mm was used as the heating means, the coating was patterned such that there were 4 lines of B, G or R per 1 mm, that is, 12 lines in total per 1 mm. Thus, the image carrying sheet consisted of the substrate and the color-striped coating.

The polymer liquid crystal film was scanned with the thermal head in order to apply heat to the desired portions of the medium in accordance with temperature curves similar to those shown in FIG. 1, while the heating elements of the head were precisely registered with the color stripes of the medium. In this way, scattering portions and transparent portions, such as those shown in FIG. 7, were formed in the desired composition. During this operation, if the periods $\Delta t_R$, $\Delta t_G$ and $\Delta t_B$ were set at the same value, in the resultant image, the color red was slightly dull, and the color white was slightly bluish. When the period $\Delta t_R$ was made longer than any of the other periods, the color red evidenced increased brightness.

EXAMPLE 2

In this example, the basic arrangements are made adopting the principle shown in FIG. 8. A thermal head having 8 heating elements per 1 mm was used, with every third dot sequentially corresponding to R, G or B. A polymer liquid crystal of the type VI was dissolved in dichloroethane. The solution was applied on a polyethylene terephthalate substrate to form a coating of 8 μm, thereby preparing a white sheet having the substrate and the coating. The sheet was subjected to heating and scanning in accordance with temperature curves similar to those shown in FIG. 1. The resultant sheet was superimposed on a color stripe filter in which color stripes of R, G and B are sequentially formed at the pitch of 125 μm. When color display was effected, good color balance was obtained.

EXAMPLE 3

In this example, a sheet having a colored polymer liquid crystal film is prepared in the following manner. A plurality of polymer liquid crystal materials differing from each other in the temperature of change from a scattering state to a transparent state (or vice versa), particularly concerning $T_{iso}$, are prepared, one for each of the colors blue (B), red (R) and green (G). Mixed with the corresponding materials are dyes capable of optical absorption within at least the visible region, such as B, R and G dyes of dichromatic, anaxial or other suitable type. The resultant mixtures are applied on a transparent substrate made of glass, polyester or the like. The coating was formed, by a printing method such as dot printing or a coating method, into a mosaic or striped color pattern having polymer liquid crystal portions $PLC_B$, $PLC_R$, and $PLC_G$.

Specifically, the film of the colored polymer liquid crystal materials is formed in the following manner. Solid polymer liquid crystal materials corresponding to R, G and B are each ground at a temperature below $T_g$. The particles having particle sizes within the range of 20 μm ±10 μm are selected, and the selected particles of each color are mixed. The particles are then evenly dispersed and coated into a single layer by using an electrostatic coater. Thereafter, the whole surface of the layer is baked at a temperature above the highest of the $T_{iso}$s of the $PLC_B$ of three colors, thereby forming the layer into a film. In order to color the medium, small amounts of the dyes are mixed with the polymer liquid crystal materials, in the same manner as in Example 1.

Figure 5:
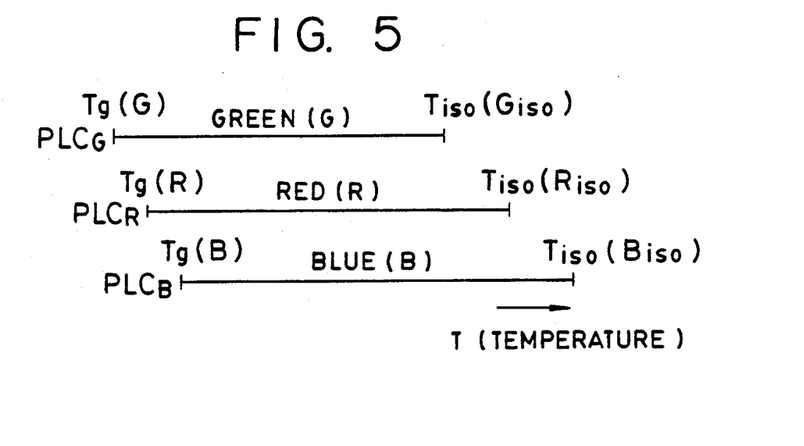
FIG. 5 shows the relationship established in Example 3 between the temperature ranges of liquid crystal areas showing green, red and blue colors.

FIG. 5 shows the relationship between the temperature ranges for the portions $PLC_B$, $PLC_R$ and $PLC_G$. An important feature of this relationship is that the temperature ranges differ from each other regarding $T_{iso}$. That is, the ranges for $PLC_B$, $PLC_R$ and $PLC_G$ have different $T_{iso}$ temperatures respectively $B_{iso}$, $R_{iso}$ and $G_{iso}$.

Figure 6:
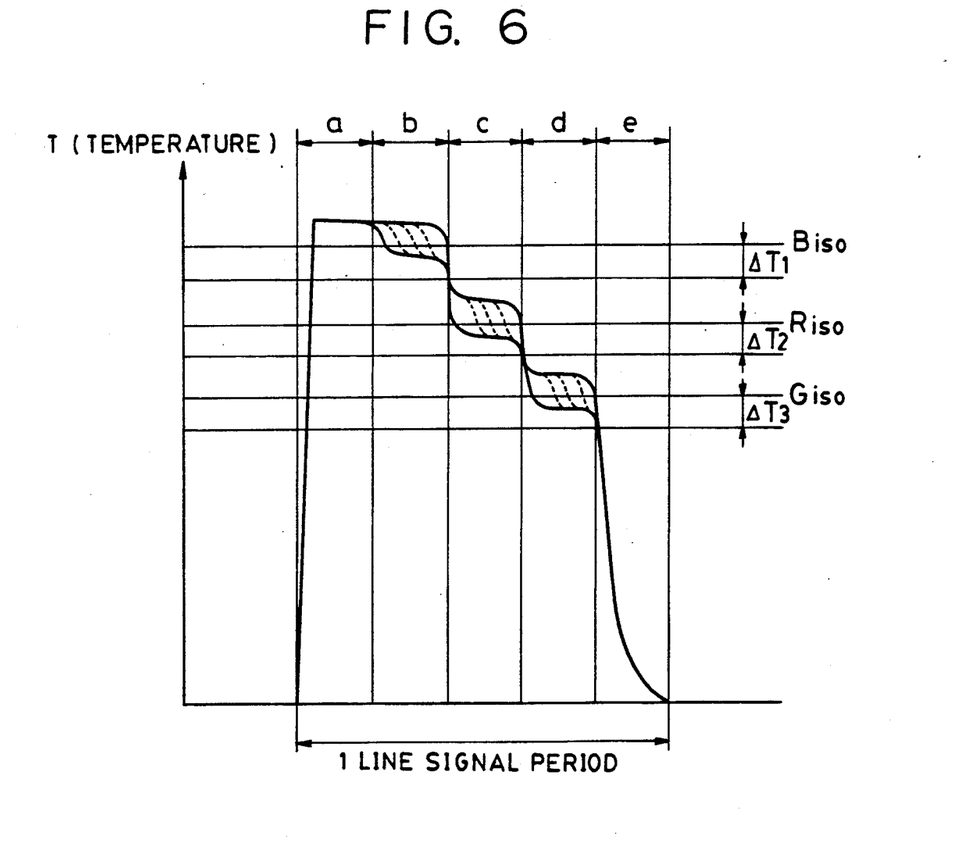
FIG. 6 shows temperature curves in accordance with the application of heat to the color image forming medium of Example 3.

FIG. 6 shows the temperature curves with which the thermal signal means shown in FIG. 2 performs heating and scanning of the color image forming medium during the processing of 1 line. In the graph, the symbol "a" designates an initialization signal sub-period within a 1 line signal period. In the sub-period "a", all the portions $PLC_B$, $PLC_R$ and $PLC_G$ are temporarily brought to transparent states. In the subsequent sub-period "b", the portions $PLC_B$ are heated in accordance with temperature curves such as those shown in FIG. 4. The application of heat determines the recording conditions of $PLC_B$. During this sub-period "b", the other portions $PLC_R$ and $PLC_G$ are maintained at isotropic temperatures, and they remain in their transparent states.

During the third sub-period "c", heat is applied to the portions $PLC_R$ in accordance with temperature curves such as those shown in FIG. 4. During this sub-period "c", the highest temperature used is set to a value below the level expressed as $(B_{iso} - \Delta T_1)$ ($\Delta T_1$ being a temperature subregion similar to $\Delta T$ and capable of causing a significant change in the state of $PLC_B$). Therefore, during this time, the state of $PLC_B$ resulting from the application of signals thereto remains substantially uninfluenced. Accordingly, during the third sub-period "c", the recording conditions of only the $PLC_R$ portions are determined, while the portions $PLC_G$ are still kept transparent.

In the fourth sub-period "d", heat is applied to the $PLC_G$ portions in accordance with FIG. 4 curves so as to determine the recording condition of $PLC_G$. During this sub-period "d", the highest temperature used is set to a value below the level expressed as $(R_{iso} - \Delta T_2)$ ($\Delta T_2$ being a temperature sub-region similar to $\Delta T_1$ and capable of significantly changing the state of $PLC_R$). Therefore, during this time, the recording on $PLC_G$ is prevented from greatly influencing the state of $PLC_B$ and $PLC_R$ on which recording has already been completed.

The last sub-period "e" is a thermal signal means cooling period. During this time, the temperature of the thermal signal means is lowered close to room temperature.

Such temperature control also that, when a thermal head serving as the thermal signal means applies signals to one line during a 1 line signal period, it is possible to simultaneously perform erasing of the previous image and recording of the desired color image. Additionally, it is helpful if the sub-periods "a" to "e" are such that c>b>d, and the individual ΔT holding time is made as long as possible within the sub-period in order to assure maximum scattering degrees. This makes it possible to achieve good color balance.

In the temperature control shown in FIG. 6, the temperatures $B_{iso}$, $R_{iso}$ and $G_{iso}$ shown in FIG. 5 should preferably have differences from one another of 10° C. or greater. It can be said that, basically, color separation during recording becomes easier as these temperature differences become greater. In this regard, the materials used to form the $PLC_G$, $PLC_R$ and $PLC_B$ may respectively be, for example, the above-mentioned polymer liquid crystal types (VIII), (IX) and (X).

EXAMPLE 4

Figure 9:
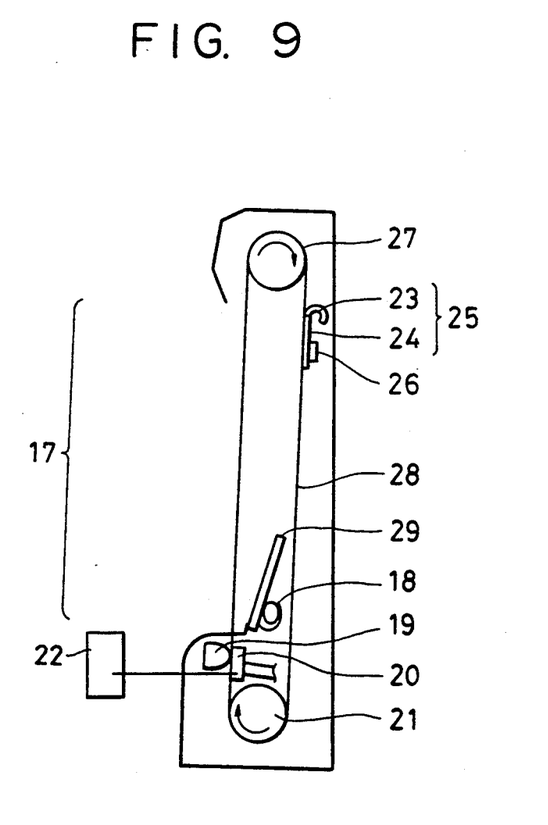
FIG. 9 is an example of a color image forming apparatus which may be used to carry out the present invention.

A polymer liquid crystal film of the same type as that in Example 1 is formed into a belt-like member, and is incorporated into a color image forming apparatus capable of repeatedly displaying images. Such an apparatus is shown in FIG. 9. The apparatus includes a display section 17, a light source 18, a platen 19, a thermal head 20, a roller 21, a thermal head driver 22, an erasing heater 25 having a halogen lamp 23 and a heating resister unit 24, a temperature sensor 26, a driving roller 27, an image carrying belt 28, and a Fresnel lens 29. These component parts form a writing section (19, 20 and 22), an erasing section (22, 23, 24), and a light source section (18).

The thermal head 20 and the thermal head driver 22 constitute the writing means of the writing section. The driver 22 includes a signal applying device capable of generating electrical signals at predetermined intervals, and an amplifier. The thermal head 20 is driven by the driver 22 in such a manner that the medium is continuously supplied with thermal energies of different temperatures. The ΔT holding time (in FIG. 1) is adjusted by applying thermal pulses in a multi-stage manner, and suitably selecting temperature levels and periods which determine gradual temperature drops.

As described above, according to the present invention, it is possible to achieve the optimum color balance of color image displays, and achieve clear color displays with a thermosensitive body such as a polymer liquid crystal.

What is claimed is:

1. A color image forming method for forming a color image by forming a scattering state in picture-element areas in a thermosensitive medium corresponding to more than two colors, comprising the steps of:
    selecting a thermosensitive medium capable of reversibly assuming an optical state of being transparent and an optical state of scattering light;
    selecting a color filter having more than two colors on one same surface;
    forming the scattering state in picture-element areas which correspond to at least two colors, wherein said scattering state is formed in said picture-element areas corresponding to the color whose spectral transmission center is, among those of the colors to be displayed, closest to the longest wavelength involved, and the maximum haze degree of said picture-elements is greater than the maximum haze degree of those picture-elements corresponding to any of the other colors to be displayed.

2. A method according to claim 1, wherein said thermosensitive medium comprises a polymer liquid crystal film.

3. A method according to claim 2, wherein said scattering state is formed in said polymer liquid crystal layer by selectively heating a portion of said polymer liquid crystal layer and maintaining said heated portion of polymer liquid crystal layer in a heated condition for a predetermined period of time.

4. A color image forming method for forming a color image by forming a scattering state in picture-element areas corresponding to three colors, comprising the steps of:
    selecting a thermosensitive means capable of reversibly assuming an optical state of being transparent and an optical state of scattering light;
    selecting a color filter having green, blue and red colors on one surface; and
    forming a scattering state of said thermosensitive medium wherein those picture-element areas corresponding to the color red has a higher scattering device than those picture-element areas of said thermosensitive medium colors corresponding to green or blue when said scattering state is formed in the picture element areas corresponding to said three colors.

5. A method according to claim 4, wherein said thermosensitive medium comprises a polymer liquid crystal film.

6. A method according to claim 5, wherein said scattering sate is formed in said polymer liquid crystal layer by selectively heating a portion of said polymer liquid crystal layer and maintaining said heated portion of polymer liquid crystal layer in a heated condition for a predetermined period of time.

7. A method according to claim 4, said method comprising the step of forming a scattering state in said thermosensitive medium wherein those picture-element areas corresponding to the color green have a lower scattering degree than the picture-element areas of said thermosensitive medium corresponding to the color blue.

8. A color image forming method for forming a color image by forming a scattering state in picture-element areas in a thermosensitive medium corresponding to at least two colors comprising the steps of:
    selecting a layer consisting of a thermosensitive medium capable of reversibly assuming an optical state of being transparent and an optical state of scattering light, said layer being colored with at least two different colors;
    forming a scattering state in the picture-element areas corresponding to said at least two colors, wherein said scattering state which is formed in said picture-element areas corresponding to the color of said at least two colors having the longest spectral transmission center wavelength also has the maximum haze degree among said picture elements corresponding to the colors to be displayed.

9. A method according to claim 8, wherein said areas of said different colors are of different polymer liquid crystals.

10. A method according to claim 8, wherein said thermosensitive medium is a color polymer liquid crystal.

11. A method according to claim 10, wherein said color polymer liquid crystal further comprises dyes or pigments.

12. A method according to claim 11, wherein said dyes or pigments are added in a total amount equal to 0.01 to 30% by weight of the polymer liquid crystal.

13. A method according to claim 11, wherein said dyes or pigments are added in a total amount equal to 0.1 to 10% by weight of the polymer liquid crystal.

14. A method according to claim 11, wherein said dyes or pigments are added in a total amount equal to 0.1 to 5% by weight of the polymer liquid crystal.

15. A method according to any of claims 11 to 14, wherein the individual volumes of the dyes or pigments for each color are substantially equal.

16. A method according to claim 15, wherein the individual volumes of dye or pigment are within the range of ±5%.

17. A method according to claim 10, wherein said areas of said different colors are of different polymer liquid crystals.

18. A method according to claim 10, wherein said scattering state is formed in said polymer liquid crystal layer by selectively heating a portion of said polymer liquid crystal layer and maintaining said heated portion of polymer liquid crystal layer in a heated condition for a predetermined period of time.

19. A color image forming method for forming a color image by forming a scattering state in picture-element areas corresponding to colors of green, blue and red, comprising the steps of:
  selecting a layer consisting of a thermosensitive medium capable of reversibly assuming an optical state of being transparent and an optical state of scattering light, said layer being colored on one surface with colors of green, blue and red; and
  forming a scattering state in the picture-element areas corresponding to said green, blue and red colors;
  wherein the scattering state of said thermosensitive medium in the picture-element areas corresponding to the color red has a higher scattering degree than the scattering state of said thermosensitive medium in the picture-element areas of the other colors.

20. A method according to claim 19, wherein said thermosensitive medium is a color polymer liquid crystal.

21. A method according to claim 20, wherein said color polymer liquid crystal further comprises dyes or pigments.

22. A method according to claim 21, wherein said dyes or pigments are added in a total amount equal to 0.01 to 30% by weight of the polymer liquid crystal.

23. A method according to claim 21, wherein said dyes or pigments are added in a total amount equal to 0.1 to 10% by weight of the polymer liquid crystal.

24. A method according to claim 21, wherein said dyes or pigments are added in a total amount equal to 0.1 to 5% by weight of the polymer liquid crystal.

25. A method according to claims 21 to 24, wherein the individual volumes of the dyes or pigments for each color green, blue and red are substantially equal.

26. A method according to claim 25, wherein the individual volumes of dye or pigment are within the range of ±5%.

27. A method according to claim 20, wherein said scattering state is formed in said polymer liquid crystal layer by selectively heating a portion of said polymer liquid crystal layer and maintaining said heated portion of polymer liquid crystal layer in a heated condition for a predetermined period of time.

28. A method according to claim 19, said method comprising the step of forming a scattering state in aid thermosensitive medium corresponding wherein those picture-element areas corresponding to the color green have a lower scattering degree than the picture-element areas of said thermosensitive medium corresponding to the color blue.

* * * * *

UNITED STATES PATENT AND TRADEMARK OFFICE
CERTIFICATE OF CORRECTION

PATENT NO. : 5,103,332
DATED : April 7, 1992
INVENTOR(S) : SHUZO KANEKO ET AL.

It is certified that error appears in the above-identified patent and that said Letters Patent is hereby corrected as shown below:

COLUMN 5

Form VIII, "  " should read

--.

COLUMN 7

Form VIII, "  " should read

--.

COLUMN 10

Line 42, "region ←T" should read --region$\Delta$T--

COLUMN 12

Line 11, "$PLC_B$" should read --PLCs--.

UNITED STATES PATENT AND TRADEMARK OFFICE
CERTIFICATE OF CORRECTION

PATENT NO. : 5,103,332

DATED : April 7, 1992

INVENTOR(S) : SHUZO KANEKO ET AL.

Page 2 of 2

It is certified that error appears in the above-identified patent and that said Letters Patent is hereby corrected as shown below:

COLUMN 14

Line 14, "means" should read --medium--.
Line 21, "has" should read --have--.
Line 22, "device" should read --degree--.
Line 31, "sate" should read --state--.

COLUMN 16

Line 18, "to claims 21 to 24," should read --to any of claims 21 to 24,--.
Line 32, "aid" should read --said--.
Line 33, "corresponding" should be deleted.

Signed and Sealed this

Twelfth Day of October, 1993

Attest:

BRUCE LEHMAN

*Attesting Officer*  *Commissioner of Patents and Trademarks*